United States Patent
Steinman et al.

(10) Patent No.: US 10,216,742 B2
(45) Date of Patent: Feb. 26, 2019

(54) CONVERTING DATA SETS IN A SHARED COMMUNICATION ENVIRONMENT

(71) Applicant: Honeywell International Inc., Morristown, NJ (US)

(72) Inventors: Jethro Francis Steinman, Haverford, PA (US); Michael Baker, Perkasie, PA (US); Gregory R. Leib, Downingtown, PA (US); Christopher Pulini, Ambler, PA (US)

(73) Assignee: Honeywell International Inc., Morris Plains, NJ (US)

(*) Notice: Subject to any disclaimer, the term of this patent is extended or adjusted under 35 U.S.C. 154(b) by 790 days.

(21) Appl. No.: 14/839,474

(22) Filed: Aug. 28, 2015

(65) Prior Publication Data

US 2017/0060882 A1    Mar. 2, 2017

(51) Int. Cl.
    *G06F 17/30* (2006.01)
(52) U.S. Cl.
    CPC .............. *G06F 17/30076* (2013.01)
(58) Field of Classification Search
    None
    See application file for complete search history.

(56) References Cited

U.S. PATENT DOCUMENTS

| 7,290,003 | B1* | 10/2007 | Tong ............... G06F 17/227 |
| 2002/0010714 | A1 | 1/2002 | Hetherington |
| 2004/0163038 | A1 | 8/2004 | Yano et al. |
| 2007/0185591 | A1 | 8/2007 | Frei et al. |
| 2009/0259676 | A1* | 10/2009 | Yamada .............. G05B 15/02 |
| 2013/0006955 | A1 | 1/2013 | Jullien et al. |
| 2014/0012824 | A1 | 1/2014 | Bailey |

FOREIGN PATENT DOCUMENTS

KR    960016882 B1    12/1996

* cited by examiner

*Primary Examiner* — Belix M Ortiz Ditren

(57) ABSTRACT

A system and method for converting data sets. The method includes providing a data provider device (DPD) and a controller communicably coupled to one another. The controller or an interface device between the controller and the DPD includes a processor that is connected to a memory device which stores a data converter program. The memory device stores an earlier in time descriptive data set having an earlier data set format and a different later in time descriptive data set having a later data set format. The data converter program determines if a format associated with a received DPD data set is the later data set format. In response to determining that a data set format associated with the received DPD data set is the later data set format, the received DPD data set is converted into a converted data set that has the earlier data set format.

14 Claims, 6 Drawing Sheets

CONVERTING DATA SETS IN A SHARED COMMUNICATION ENVIRONMENT

FIELD

Disclosed embodiments relate to communication networks used in industrial facilities, and more specifically relate to a system and method for converting data sets in a shared communication environment.

BACKGROUND

Industrial facilities use communication networks to transmit and receive information and data. The industrial facilities can include various industries and applications such as process or industrial manufacturing, building automation, substation automation, and automatic meter reading. The communication networks can use a variety of communication network protocols. Several protocols have been developed for power system automation.

Substations in high and medium-voltage power networks include primary devices such as electrical cables, lines, bus bars, switches, power transformers and instrument transformers, which are generally arranged in switch yards and/or bays. These primary devices are operated in an automated way via a Substation Automation (SA) system. The SA system includes secondary devices, so-called Intelligent Electronic Devices (IED), which are responsible for protection, control and monitoring of the primary devices. The IEDs may be assigned to hierarchical levels, for example, the station level, the bay level, and the process level, the latter being separated from the bay level by a so-called process interface.

One such international communication network protocol, International Electrotechnical Commission (IEC) 61850, is a standard for the design of electrical substation automation for a power system having a controller, and a plurality of IEDs that monitor primary devices. IEC 61850 is a part of the IEC Technical Committee reference architecture for electric power systems. The communication protocol between the IEDs and the controller can run over TCP/IP networks or substation LANs using high speed switched Ethernet.

One problem that occurs when using a communication protocol such as IEC 61850 is that there can be multiple subscribers to a single set of data. The single set of data is configured to include all the data that any subscriber might need, even if not all subscribers require or can use all of the data contained in the single data set. Further, the definition of the single set of data is subject to change over time.

When an industrial control system is configured to use or consume data for a single set of data, the design and engineering activities are frequently completed prior to installation at an industrial site. After the engineering activities have been completed for the industrial control system, it is disadvantageous and costly to modify the industrial control system at the time of site installation. Unfortunately, because the single set of data may require changes unrelated to the function of the control system, the control system may be required to be redesigned or modified on order to properly function.

SUMMARY

This summary is provided to introduce a brief selection of disclosed concepts in a simplified form that are further described below in the Detailed Description including the drawings provided. This Summary is not intended to limit the claimed subject matter's scope.

Disclosed embodiments comprise a method for converting data sets and a system for implementing the method. The method includes providing communicatively coupling between at least one physical device comprising an Intelligent Electronic Device (IED) generally referred to herein as a data provider device (DPD) and at least one controller for connecting data transmissions between the DPD and the controller. In one disclosed arrangement there is an interface device between the DPD(s) and the controller, and in another disclosed arrangement, the DPD(s) are communicably connected to the controller by an intervening interface device. The interface device or the controller includes a processor that is connected to a memory device that stores a data converter program. The memory device also stores an earlier in time descriptive data set having an earlier in time data set format and a different later in time descriptive data set having a later data set format.

The earlier in time descriptive data set and the later in time descriptive data set are acquired from the DPD. The interface device or controller is programmed to implement the data converter program and causes the determining if a format associated with a received DPD data set is the later data set format. In response to determining that a data set format associated with the received DPD data set is the later data set format, the received DPD data set is converted into a converted data set that has the earlier data set format. In the case of the system including an interface device, the converted data set is then transmitted to the controller.

DETAILED DESCRIPTION

Figure 1A:
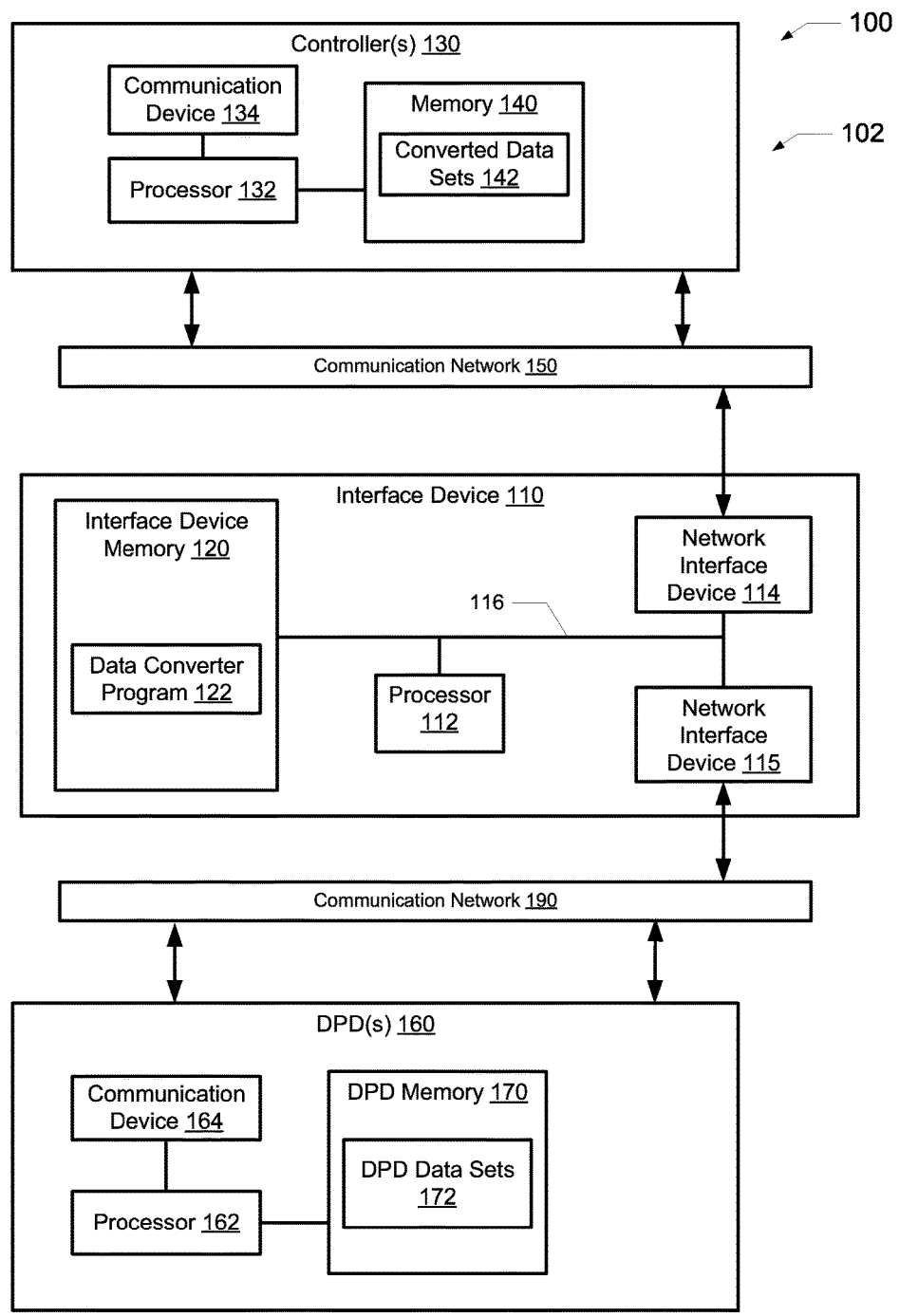
FIG. 1A is a block diagram of an example system that includes an intervening interface device implementing a data converter program for converting data sets in a shared communication environment including data provider devices, according to an example embodiment.

Disclosed embodiments are described with reference to the attached figures, wherein like reference numerals are used throughout the figures to designate similar or equivalent elements. The figures are not drawn to scale and they are provided merely to illustrate certain disclosed aspects. Several disclosed aspects are described below with reference to example applications for illustration. It should be understood that numerous specific details, relationships, and methods are set forth to provide a full understanding of the disclosed embodiments.

One having ordinary skill in the relevant art, however, will readily recognize that the subject matter disclosed herein can be practiced without one or more of the specific details or with other methods. In other instances, well-known structures or operations are not shown in detail to avoid obscuring certain aspects. This Disclosure is not limited by the illustrated ordering of acts or events, as some acts may occur in different orders and/or concurrently with other acts or events. Furthermore, not all illustrated acts or events are required to implement a methodology in accordance with the embodiments disclosed herein.

FIG. 1A illustrates a block diagram of an example system 100 that includes an intervening interface device 110 implementing a data converter program 122 for converting data sets in a shared communication environment. As shown in FIG. 1A, system 100 comprises an interface device 110 that is in communication with one or more industrial or process controllers (controllers) 130 located in an industrial facility via a communication network 150. In one embodiment, the industrial facility can be part of an electrical power grid or an electrical power substation. The controllers 130 can control one or more functions of components and processes within the industrial facility. The interface device 110 is also in communication with one or more data provider device(s) (DPDs) 160, hereafter DPD or DPDs 160 via a communication network 190. DPD 160 can be located with interface device 110 or can be located remotely from interface device 110.

Interface device 110 includes a processor 112 (e.g., digital signal processor (DSP), microprocessor or microcontroller unit (MCU)) that is coupled to an associated interface device memory 120 via a system bus 116. Interface device memory 120 stores a data converter program (DCP) 122. Processor 112 can perform any one or more of the operations, applications, methods or methodologies described herein. A processor 112 performs the converting of data sets to implement disclosed embodiments because a human cannot monitor, determine if a data set requires converting and convert data sets provided essentially continuously on the order of milliseconds as this is clearly too fast for a person to do. Processor 112 is also coupled to a network interface device 114 which facilitates communication with communication networks 150 and 190. Processor 112 is coupled to memory 120 and network interface device 140 via the system bus 116.

Controller 130 is shown including a computing device such as a processor 132 (e.g., digital signal processor (DSP), microprocessor or microcontroller unit (MCU)) that is coupled to an associated memory 140. Processor 132 is also coupled to a communication device 134. Communication device 134 can transmit and receive data via communication network 150. In one embodiment, the communication device 134 can transmit and receive data from communication network 150 via wireless signals. Memory 140 stores converted data sets 142 that are received from interface device 110.

DPD 160 includes a computing device such as a processor 162 (e.g., digital signal processor (DSP), microprocessor or microcontroller unit (MCU)) that is coupled to a DPD memory 170. Processor 162 is also coupled to a communication device 164. Communication device 164 can transmit and receive data via communication network 190. In one embodiment, the communication device 164 can transmit and receive data from communication network 190 via wireless signals.

Figure 1B:
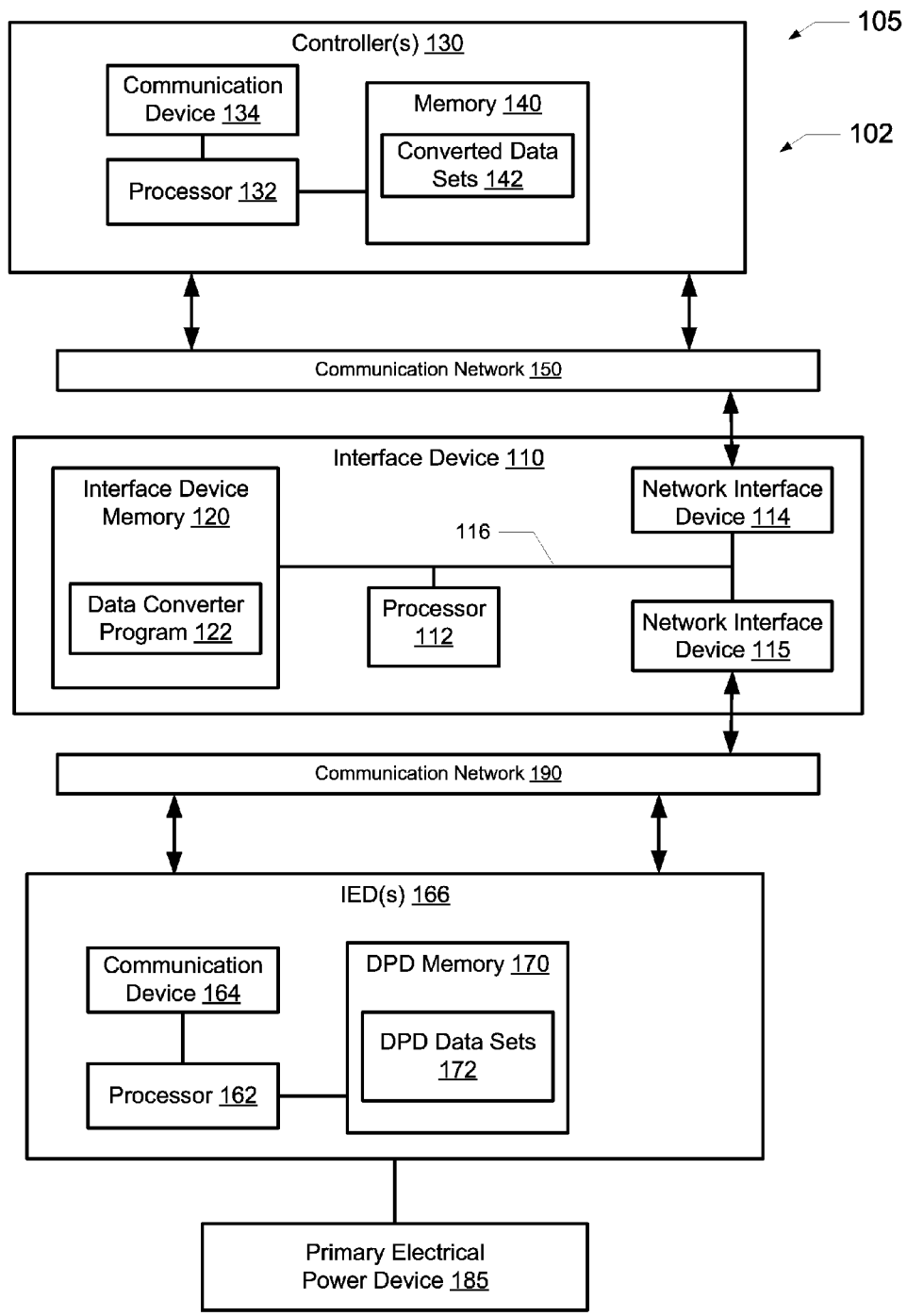
FIG. 1B is a block diagram of an example power system that includes an intervening interface device implementing a data converter program for converting data sets in a shared communication environment including the data provider devices shown as intelligent electronic devices, according to an example embodiment.

FIG. 1B shows the DPDs 160 in FIG. 1A being intelligent electronic devices (IEDs) 166 in an example power system 105 that includes an intervening interface device 110 implementing a data converter program 122 for converting data sets in a shared communication environment. In this embodiment, controllers 130, and IEDs 166 are located within an electrical power substation 102 of an electrical power grid. The IED 166 is communicatively coupled to the controller 130 via interface device 110 for protection, control and monitoring of at least one 1 primary electrical power device 185 within the electrical power substation. The primary electrical power devices include various electrical power substation components such as electrical cables, power lines, bus bars, switches, power transformers, instruments and instrument transformers.

Memory 170 stores current process variable values (DPD data sets) 172, hereafter DPD data sets 172. Data sets 172 are a large set of data that is consumed or used by multiple controllers 130. Because of this relationship, data sets 172 can include data that is not needed or wanted by the controllers 130. Further because data sets 172 are intended to meet the needs of multiple controllers, the layout or format of data sets 172 can change based on the needs of a specific controller 130, thereby indirectly impacting other controllers using data sets 172.

The interface device 110 is programmed to implement the data converter program 122 causing the interface device 110 to determine if a format associated with received data sets 172 are a later data set format. If the data set format associated with the received data set 172 is the later data set format, the interface device 110 converts the data sets to an earlier data set format shown as converted current process variable values (converted data set 142) which is transmitted to the controller(s) 130 over the communication network 150.

The interface device 110 executing data converter program 122 acts as an agent between the large data sets 172 and the controllers 130 to map, translate or extract out converted data sets 142 that are of interest to controllers 130, notwithstanding any variations in data set format induced by the needs of separate controllers 130. The interface device 110 has sufficient data regarding the format and type of data required by controllers 130 stored in interface device memory 120 to extract the data sets required by controllers 130.

Figure 1C:
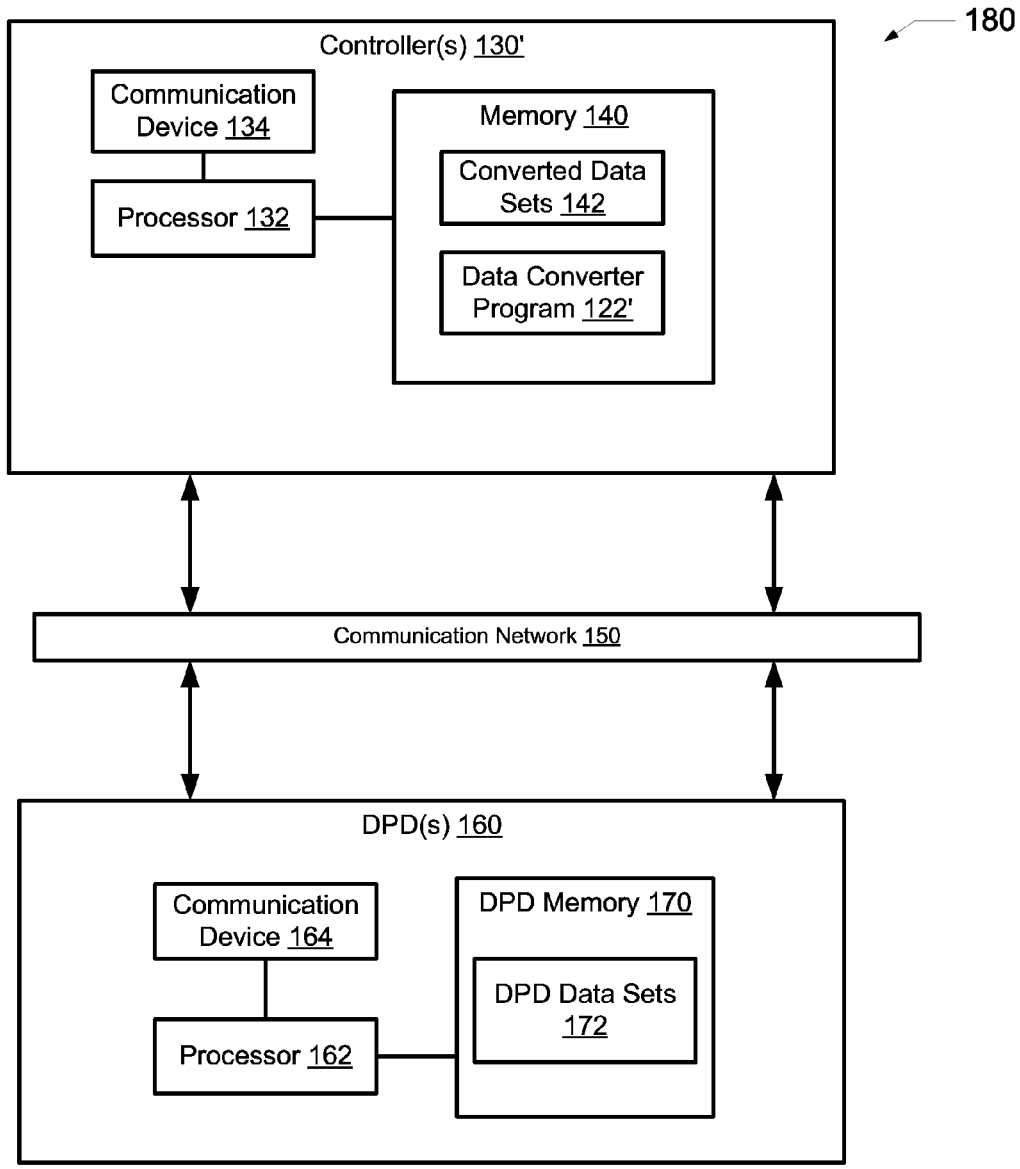
FIG. 1C illustrates a block diagram of an example system for converting data sets in a shared communication environment where the data converter program is implemented directly in the controller without the need for an intervening interface device as shown in FIGS. 1A and 1B.

In another embodiment, the data converter program 122 can be executed by the processor 132 of the controller 130 such that interface device 110 can be omitted. FIG. 1C illustrates a block diagram of an example system 180 for converting data sets in a shared communication environment where the data converter program 122' is implemented directly in the controller shown as 130', without the need for an intervening interface device 110 as shown in FIGS. 1A and 1B. As shown in FIG. 1C, system 180 comprises controller 130' located in an industrial facility which via communication network 150 is in direct communication with one or more DPDs 160.

Figure 2:
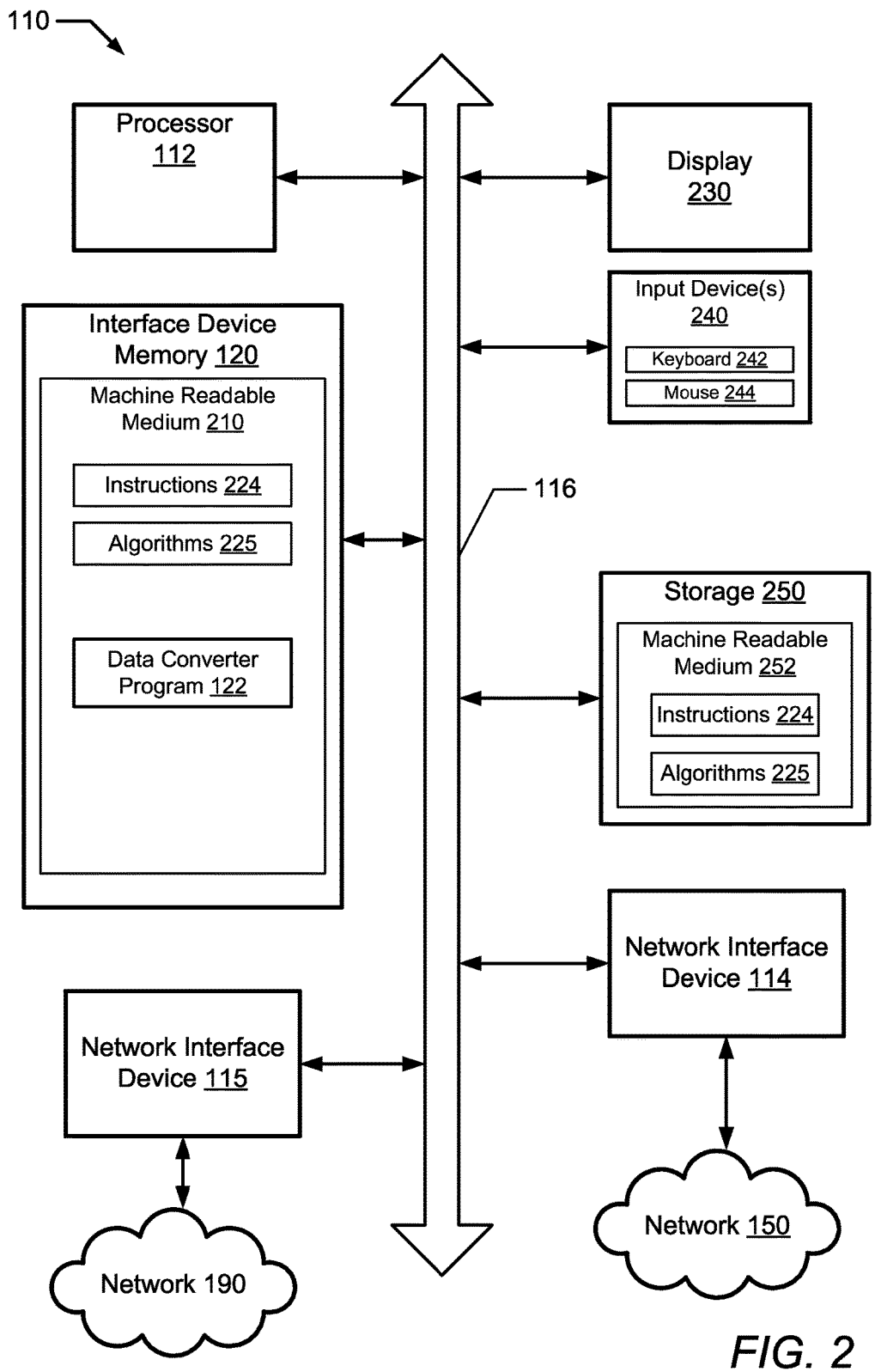
FIG. 2 is a block diagram of an example interface device, according to an example embodiment.

FIG. 2 illustrates an example block diagram of interface device 110 within which a set of instructions 224 and/or algorithms 225 can be executed causing the interface device 110 to perform any one or more of the methods, processes, operations, applications, or methodologies described herein. Interface device 110 includes one or more processors 112 such as a central processing unit (CPU) and a storage device such as memory 120, which communicate with each other via system bus 116 which can represent a data bus and an address bus. Memory 120 includes a machine readable medium 210 on which is stored one or more sets of software such as instructions 224 and/or algorithms 225 embodying any one or more of the methodologies or functions described herein. Memory 120 can store instructions 224 and/or algorithms 225 for execution by processor 112. The interface device 110 further includes a display 230 such as a video screen that is connected to system bus 116. The interface device 110 also has input devices 240 such as an alphanumeric input device (e.g., keyboard 242) and a cursor control device (e.g., a mouse 244) that are connected to system bus 116. In some embodiments, display 230 and input devices 230 can be omitted.

A storage device 250, such as a hard drive or solid state drive, is connected to and is in communication with the system bus 116. The storage device 250 includes a machine readable medium 252 on which is stored one or more sets of software such as instructions 224 and/or algorithms 225 embodying any one or more of the methodologies or functions described herein. The instructions 224 and/or algorithms 225 can also reside, completely or at least partially, within the memory 120 and/or within the processor 112 during execution thereof. The memory 120 and the processor 112 also contain machine readable media. In one embodiment, instructions 224 and/or algorithms 225 can be remotely loaded via networks 150 or 190.

While the machine readable medium 210 is shown in an example embodiment to be a single medium, the term "machine readable medium" should be taken to include a single medium or multiple media (e.g., a centralized or distributed database, and/or associated caches and servers) that store the one or more sets of instructions. The term "machine readable medium" shall also be taken to include any medium that is capable of storing, encoding or carrying a set of instructions for execution by the computer system and that cause the computer system to perform any one or more of the methodologies shown in the various embodiments of the present invention. The term "machine readable medium" shall accordingly be taken to include, but not be limited to, solid-state memories, optical and magnetic media, and carrier wave signals.

Interface device 110 further includes a network interface devices 114 and 115 that are connected to system bus 116. Network interface device 114 is coupled to communication network 150 and network interface device 115 is coupled to communication network 190. Communication networks 150 and 190 can be a wide variety of communication systems such as hardwired networks including the internet or wireless networks including Wi-Fi or local area networks including Ethernet networks.

Machine readable medium 210 further stores data converter program 122. Data converter program 122 when executed by processor 112 converts data sets 172 received from DPD 160 to converted data sets 142 having an earlier data set format.

Figure 3C:
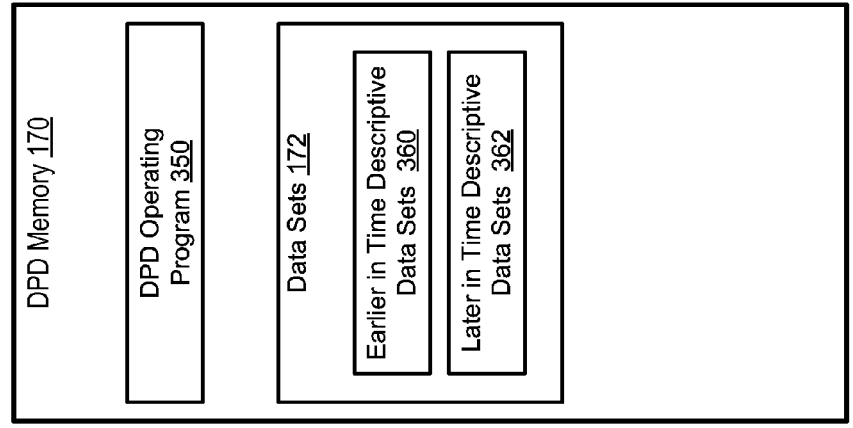
FIG. 3C illustrates contents of a data dependent device memory, according to an example embodiment.
Figure 3A:
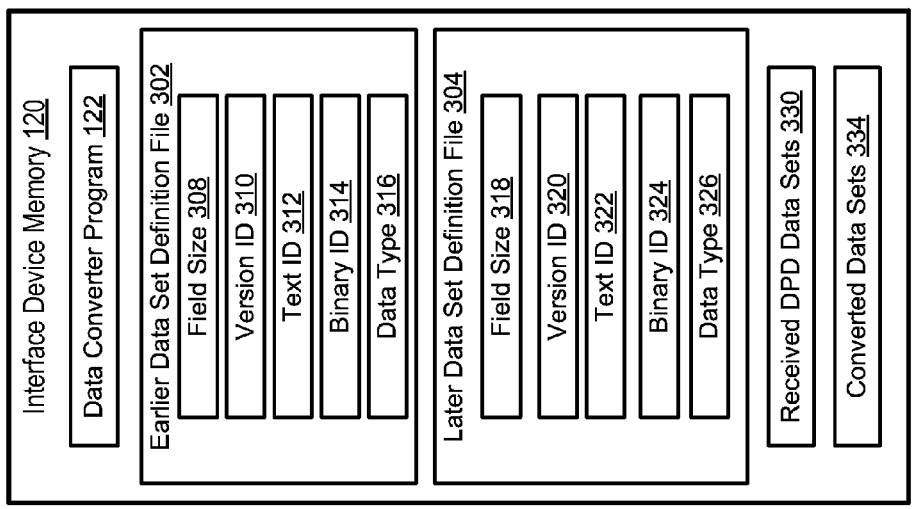
FIG. 3A illustrates contents of an interface device memory, according to an example embodiment.

FIG. 3A illustrates example contents of interface device memory 120. In addition to data converter program 122, interface device memory 120 also stores data set definition files including an earlier data set definition file 302 and a later data set definition file 304. Earlier data set definition file 302 contains data parameters including the format, layout and contents of earlier in time data sets. Earlier data set definition file 302 includes field size 308, version ID 310, text ID 312, binary ID 314 and data type 316. Later data set definition file 304 contains data parameters including the format, layout and contents of later in time data sets. Later data set definition file 304 includes field size 318, version ID 320, text ID 322, binary ID 324 and data type 326. The specific fields included in the data set definition files 302 and 304 are sufficiently complete to allow conversion from the current format to the one understood by the controller 130. In specific embodiments additional fields or fewer fields might be needed.

Interface device memory 120 further stores received DPD data sets 330 and converted data sets 334. Received DPD data sets 330 are data sets that have been received from DPD 160 (data sets 172) and stored to interface device memory 120. Converted data sets 334 are data sets that have been converted by processor 112 to a different format based on the information in data definition files 302 and 304.

Figure 3B:
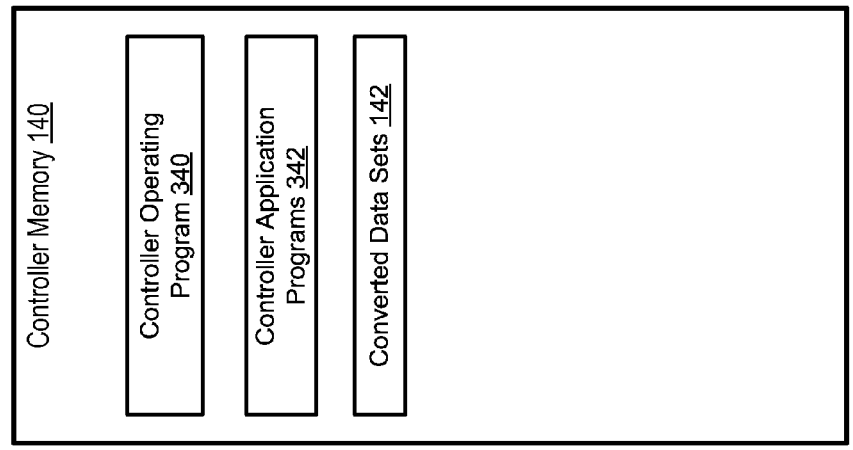
FIG. 3B illustrates contents of a controller memory, according to an example embodiment.

FIG. 3B illustrates example contents of controller memory 140. Controller memory 140 stores a controller operating program 340 that when executed by processor 132 controls the function and operation of controller 130. Controller memory 140 further stores controller application programs 342 that when executed by processor 132 provides specific functionality to controller 130. Controller memory 140 further stores converted data sets 142 that have been received from interface device 110 via communication network 150.

FIG. 3C illustrates example contents of DPD memory 170. DPD memory 170 stores a DPD operating program 350 that when executed by processor 162 controls the function and operation of DPD 160. DPD memory 170 further stores data sets 172 which include memory for storing earlier in time descriptive data sets 360 and later in time descriptive data sets 362. Although the earlier in time descriptive data sets 360 and later in time descriptive data sets 362 are both shown in data sets 172, since the DPD configuration likely changes over time, only one of these data sets 360, 362 is generally resident (stored) at any given time. For example, at an earlier time the data sets 172 will have the earlier in time descriptive data sets 360 stored (but not the later time the data sets 362 stored), and due to a DPD configuration change at a later time the data sets 172 will have the later in time descriptive data sets 362 stored (but not the earlier in time data sets 362 stored).

Figure 4:
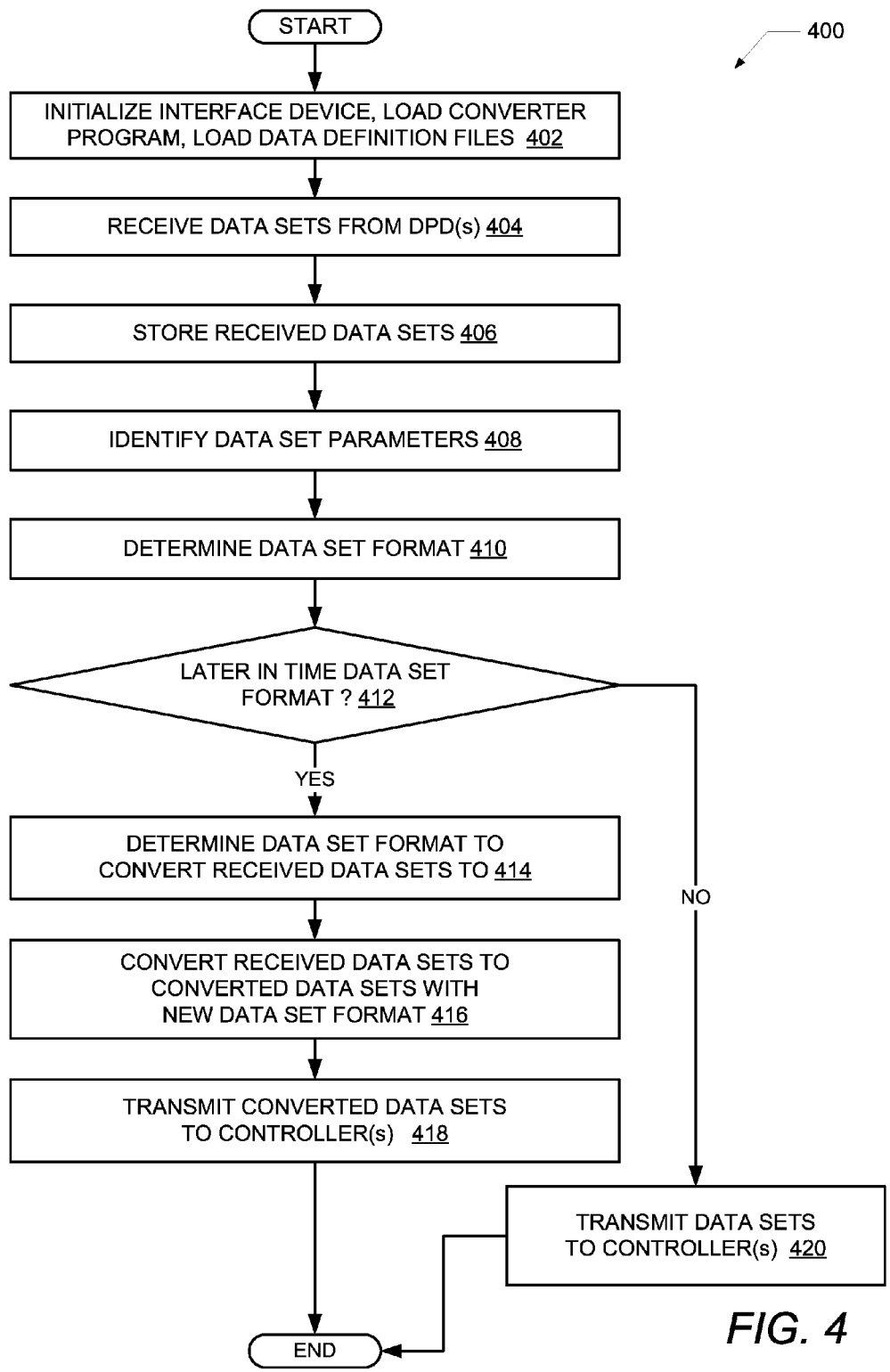
FIG. 4 is a flow chart showing steps in an example method of converting data sets, according to an example embodiment.

FIG. 4 is a flow chart showing steps in an example method 400 for converting data sets using system 100 shown in FIG. 1A that includes an intervening interface device 110 implementing the data converter program 122. With reference to FIGS. 1-4, method 400 can be implemented via the execution of instructions 224 and/or algorithms 225 by processor 112 within interface device 110 and specifically by the execution of data converter program 122 by processor 112. Method 400 begins at the start block and proceeds to block 402. At block 402, processor 112 initializes interface device 110 including loading data converter program 122 and retrieving earlier data set definition file 302 and later data set definition file 304. Processor 112 receives data sets 172 from DPD(s) 160 (block 404) and saves the received data sets to interface device memory 120 as received DPD data sets 330 (block 406). The received DPD data sets 330 contain at least one of or both of earlier in time descriptive data sets 360 and later in time descriptive data sets 362.

Processor 112 identifies several parameters within the received DPD data sets 330 (block 408). The identified parameters include at least one of a field size, a version identifier, a text identifier, a binary identifier, and a data type. Processor 112 determines the format associated with the received DPD data set 330 by matching the parameters of the later data set definition file 304 to the parameters of the received DPD data set 330 (block 410). If the format associated with the received DPD data set 330 matches the parameters of the later data set definition file 304, the received DPD data set 330 is determined to have a later in time data set format. Otherwise, the received DPD data set 330 is determined to have an earlier in time data set format.

At decision step 412, processor 112 determines if the data set format is the later data set format corresponding to the later data set definition file 304. In response to determining that the data set format associated with the received DPD data set 330 is not in the later data set format (i.e. is in the earlier data set format corresponding to the earlier data set definition file 302), processor 112 transmits the received DPD data sets 330 to the controllers 130 (block 420). Method 400 then ends.

In response to determining that the data set format associated with the received DPD data set 330 is in the later data set format, processor 112 determines a data set format to convert the received DPD data set 330 to (block 414) and converts the received DPD data sets 330 to a converted data sets 334 that has new data set format (block 416). Processor 112 transmits the converted data sets 334 to the controllers 130 (block 418). Method 400 then ends.

While various disclosed embodiments have been described above, it should be understood that they have been presented by way of example only, and not limitation. Numerous changes to the subject matter disclosed herein can be made in accordance with this Disclosure without departing from the spirit or scope of this Disclosure. In addition, while a particular feature may have been disclosed with respect to only one of several implementations, such feature may be combined with one or more other features of the other implementations as may be desired and advantageous for any given or particular application.

As will be appreciated by one skilled in the art, the subject matter disclosed herein may be embodied as a system, method or computer program product. Accordingly, this Disclosure can take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, this Disclosure may take the form of a computer program product embodied in any tangible medium of expression having computer usable program code embodied in the medium.

Any combination of one or more computer usable or computer-readable medium(s) may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include non-transitory media including the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CDROM), an optical storage device, or a magnetic storage device.

The invention claimed is:

1. A method for implementing a data converter program for converting data sets in a shared communication environment, the method comprising:
providing at least one data provider device (DPD) and at least one controller coupled for performing data transmissions between said DPD and said controller, said controller or an interface device positioned between said DPD and said controller including a processor connected to a memory device (memory) that stores a data converter program, an earlier in time descriptive data set having an earlier data set format and a different later in time descriptive data set having a later data set format, said earlier in time descriptive data set and said later in time descriptive data set being acquired from said DPD, wherein said interface device or said controller is programmed to implement said data converter program to execute:
initializing said interface device including loading said data converter program and retrieving an earlier data set definition file and a later data set definition file,
identifying several parameters within the received data set definition files including at least one of a field size, a version identifier, a text identifier, a binary identifier, and a data type,
determining if a format associated with a received DPD data set definition file is said later data set format by matching the parameters of the later data set definition file to the parameters of the received DPD data set; and
in response to determining that a data set definition file format associated with said received DPD data set is said later data set definition file format, converting said received DPD data set into a converted data set having said earlier data set format and transmitting the converted data set to the controller.

2. The method of claim 1, wherein said interface device is communicatively coupled between said DPD and said controller and said interface device includes said data converter program, further comprising transmitting said converted data set to said controller.

3. The method of claim 1, wherein said controller includes said data converter program.

4. The method of claim 1, wherein said DPD comprises an intelligent electronic device (IED), wherein the IED and the controller are within an electrical power substation, the IED communicatively coupled to the controller for protection, control and monitoring of a plurality of primary electrical power devices within the electrical power substation.

5. The method of claim 1, wherein said converted data set is a subset of said received DPD data set.

6. A system comprising:
at least one data provider device (DPD) communicatively coupled to at least one controller for connecting data transmissions between said DPD and said controller, said controller or an interface device positioned between said DPD and said controller including a processor connected to a memory device (memory) that stores a data converter program, an earlier-in-time descriptive data set having an earlier data set format and a different later-in-time descriptive data set having a later data set format, said earlier in time descriptive data set and said later-in-time descriptive data set being acquired from said DPD, wherein said controller or said interface device is programmed to implement said data converter program to cause said controller or interface device to:
initialize said interface device including loading said data converter program and retrieving an earlier data set definition file and a later data set definition file, identify several parameters within the received data set definition files including at least one of a field size, a version identifier, a text identifier, a binary identifier, and a data type, determine if a format associated with a received DPD data set definition file is said later data set format by matching the parameters of the later data set definition file to the parameters of the received DPD data set; and in response to determining that a data set definition file format associated with said received DPD data set is said later data set definition file format, converting said received DPD data set into a converted data set having said earlier data set format and transmitting the converted data set to the controller.

7. The system of claim 6, wherein said interface device is communicatively coupled between said DPD and said controller and said interface device includes said data converter program, and wherein said data converter program further causes said interface device to transmit said converted data set to said controller.

8. The system of claim 6, wherein said controller includes said data converter program.

9. The system of claim 6 wherein said DPD comprises an intelligent electronic device (IED), wherein the IED, and the controller are within an electrical power substation, the IED communicatively coupled to the controller for protection, control and monitoring of a plurality of primary electrical power devices within the electrical power substation.

10. The system of claim 6 wherein said data converter program further causes said controller or said interface device to:

identify a plurality of parameters within said DPD data sets.

11. A system comprising:

an interface device communicatively coupled between at least one data provider device (DPD) and at least one controller for connecting data transmissions between said DPD and said controller, said interface device including a processor connected to a memory device (memory) that stores a data converter program, an earlier-in-time descriptive data set having an earlier data set format and a different later-in-time descriptive data set having a later data set format, said earlier in time descriptive data set and said later-in-time descriptive data set being acquired from said DPD, wherein said interface device is programmed to implement said data converter program to cause said interface device to:

initialize said interface device including loading said data converter program and retrieving an earlier data set definition file and a later data set definition file from the memory, identify several parameters within the received data set definition files including at least one of a field size, a version identifier, a text identifier, a binary identifier, and a data type, determine if a format associated with a received DPD data set definition file is said later data set format by matching the parameters of the later data set definition file to the parameters of the received DPD data set; and in response to determining that a data set definition file format associated with said received DPD data set is said later data set definition file format, converting said received DPD data set into a converted data set having said earlier data set format, and transmitting the converted data set to the controller.

12. The system of claim 11 wherein said data converter program further causes said interface device to:

responsive to determining that said data set format associated with said received DPD data set is not said later data set format, transmit said received DPD data set to said at least one controller.

13. The system of claim 11 wherein said DPD comprises an intelligent electronic device (IED), wherein the IED, and the controller are within an electrical power substation, the IED communicatively coupled to the controller for protection, control and monitoring of a plurality of primary electrical power devices within the electrical power substation.

14. The system of claim 11 wherein said data converter program further causes said interface device to:

identify a plurality of parameters within said DPD data sets.

* * * * *